United States Patent
Maher, III et al.

(10) Patent No.: US 6,910,134 B1
(45) Date of Patent: Jun. 21, 2005

(54) METHOD AND DEVICE FOR INNOCULATING EMAIL INFECTED WITH A VIRUS

(75) Inventors: Robert Daniel Maher, III, Plano, TX (US); Brian Michael Forbes, Plano, TX (US); Milton Andre Lie, McKinney, TX (US); Mark Warden Hervin, Plano, TX (US)

(73) Assignee: Netrake Corporation, Plano, TX (US)

( * ) Notice: Subject to any disclaimer, the term of this patent is extended or adjusted under 35 U.S.C. 154(b) by 750 days.

(21) Appl. No.: 09/651,665

(22) Filed: Aug. 29, 2000

(51) Int. Cl.[7] .............................. H04F 9/32; H04L 9/00
(52) U.S. Cl. ....................... 713/200; 713/187; 713/188; 713/193; 713/194; 713/201
(58) Field of Search ................................ 713/187, 188, 713/193, 194, 200, 201

(56) References Cited

U.S. PATENT DOCUMENTS

| | | | | |
|---|---|---|---|---|
| 5,623,600 A | * | 4/1997 | Ji et al. ........................ | 713/201 |
| 5,832,208 A | * | 11/1998 | Chen et al. ................... | 713/201 |
| 5,889,943 A | * | 3/1999 | Ji et al. ........................ | 713/201 |
| 6,230,288 B1 | * | 5/2001 | Kuo et al. ................... | 713/200 |
| 6,269,456 B1 | * | 7/2001 | Hodges et al. ................ | 714/38 |
| 6,381,242 B1 | * | 4/2002 | Maher et al. ................ | 370/394 |
| 6,401,210 B1 | * | 6/2002 | Templeton ................... | 713/188 |
| 6,408,336 B1 | * | 6/2002 | Schneider et al. ........... | 709/229 |
| 6,411,685 B1 | * | 6/2002 | O'Neal ...................... | 379/88.14 |
| 6,577,920 B1 | * | 6/2003 | Hypponen et al. ........... | 700/200 |
| 6,609,196 B1 | * | 8/2003 | Dickinson et al. ........... | 713/154 |
| 6,640,242 B1 | * | 10/2003 | O'Neal et al. .............. | 709/206 |

\* cited by examiner

*Primary Examiner*—Andrew Caldwell
*Assistant Examiner*—Courtney Fields
(74) *Attorney, Agent, or Firm*—Craig J. Cox

(57) ABSTRACT

A method and device for detecting and inoculating emails infected with viruses are described. The method involves identifying a particular traffic and its associated data packets as an email session and scanning the associated data packets in order to compare their contents with a database of known signatures. If a match is found between the data packets and a signature of a known virus, it is determined if there is an attachment to the email. If an attachment is detected, some or all of the bits of the data packets associated with the attachment are altered, thereby rendering the infected attachment harmless. The network device includes memory for storing the database of known signatures and a content processor able to compare the contents of data packets with a database of known signatures. The content processor is also operable to alter some or all of the bits of the attachment to inoculate the email and attachment.

18 Claims, 5 Drawing Sheets

METHOD AND DEVICE FOR INNOCULATING EMAIL INFECTED WITH A VIRUS

TECHNICAL FIELD OF THE INVENTION

The present invention relates to broadband data networking equipment. Specifically, the present invention relates to a method and a network device that is able to detect email infected with a virus and inoculate the email.

BACKGROUND OF THE INVENTION

The widespread benefits in using email, web and e-commerce as business-critical applications has changed the world dramatically. However, such a reliance on these tools has also exposed individuals and companies to threats such as email viruses, against which there are only limited answers. Anti-virus programs that run on email servers or on work stations are well known and the most common form of virus protection. The companies that sell the anti-virus programs respond to new viruses by creating and disseminating definition files which then must be installed on the server or work station running the anti-virus program. The creation and dissemination of the definition files, while prompt, still occurs after the virus has begun to spread and relies entirely on system administrators and users to download and install the definition files. With viruses such as the infamous "I Love You" virus, the delay involved in getting definition files installed, when they are installed at all, is devastating, allowing enormous damage to be done.

None of the current anti-virus solutions allows simple virus recognition signatures to be quickly disseminated to equipment within the network itself. Viruses detected at wire speeds in the network could be inoculated, such that they are harmless when received by the recipient. Such a system would allow network providers themselves to be the first line of defense against virus attacks.

Accordingly, what is needed is a network device that can scan network traffic at wire speeds, recognize emails potentially infected with viruses, and inoculate any attachment, such that any virus in the attachment is destroyed.

SUMMARY OF THE INVENTION

The present invention provides for a method and network device for detecting and inoculating emails infected with viruses. The method identifies traffic flows, or sessions, that contain email and compares the contents of the associated data packets with a database of known signatures, which includes signatures of known viruses. When an email session is identified that includes a match to a signature of a known virus, a determination is made whether the email includes an attachment. If an attachment is found the method alters some or all of the bits of the data packets corresponding to the attachment, thereby rendering the attachment and the email harmless. The match can be anywhere in the email, including the attachment itself and can consist of ASCII text in the subject line or body of the email, or can even be a binary string in the attachment.

The network device for detecting and inoculating viruses includes a memory where the database of known signatures is stored, the known signatures including signatures of known viruses. A content processor is connected to the memory and is operable to compare the contents of the data packets with the database of known signatures. If a match is detected and it is determined there is an attachment, the content processor is also operable to alter some or all of the bits of the data packets associated with the attachment. New virus signatures can be easily added to the database of known signatures, which is then recompiled using a host processor and reloaded into the memory.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art will appreciate that they can readily use the disclosed conception and specific embodiment as a basis for designing or modifying other structures for carrying out the same purposes of the present invention. Those skilled in the art will also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE DRAWINGS

Figure 1:
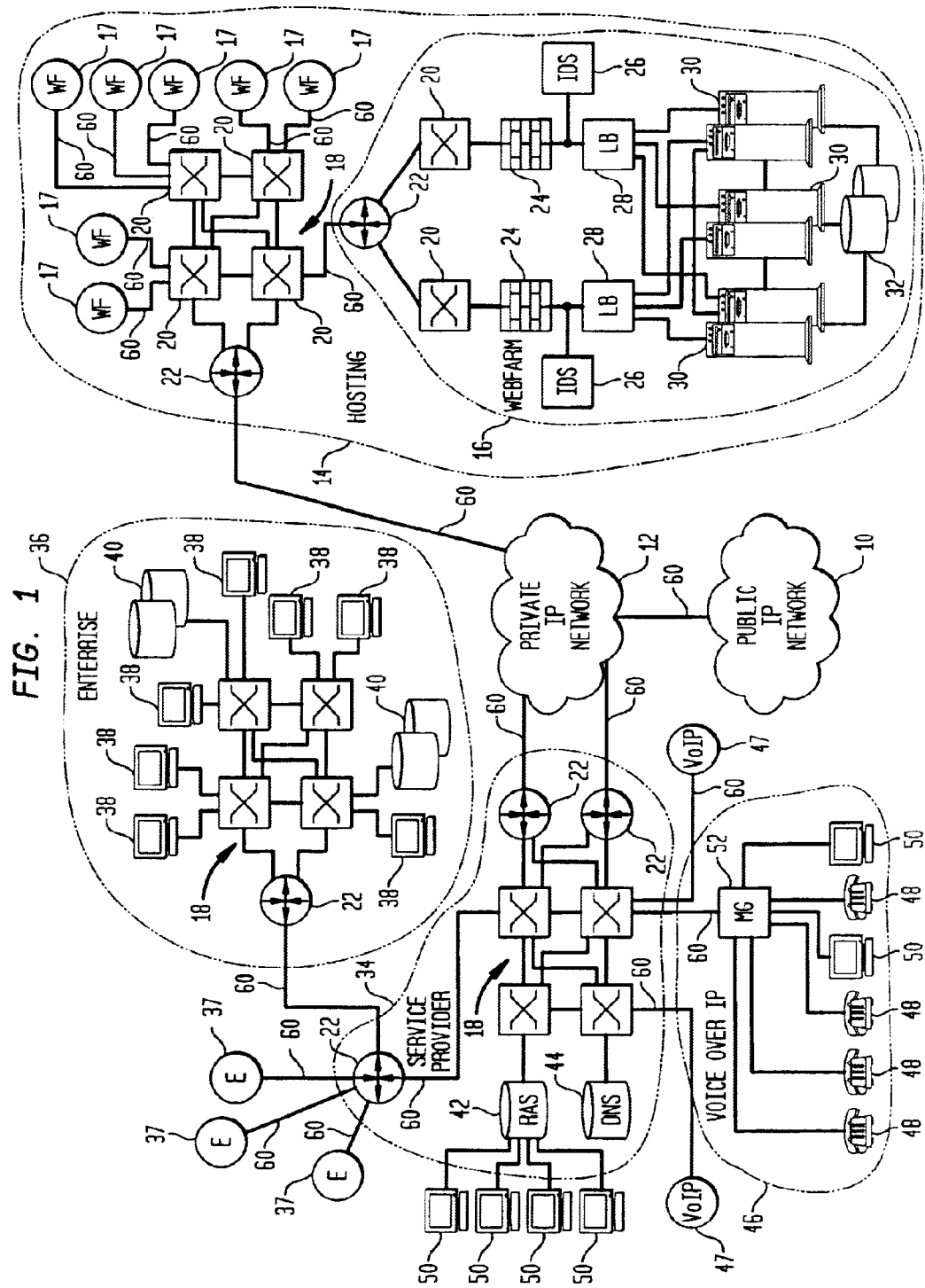
FIG. 1 is a network topology diagram illustrating example environments in which the present invention can operate.

Referring now to FIG. 1, a network topology is shown which is an example of several network infrastructures that connect in some manner to a broader public IP network 10 such as the internet. FIG. 1 is in no way meant to be a precise network architecture, but only to serve as a rough illustration of a variety of network structures which can exist on a broadband IP network. Public IP network 10 can be accessed in a variety of ways. FIG. 1 shows the public IP network being accessed through a private IP network 12 which can be the IP network of a company such as MCI or UUNET who provide private core networks. An endless variety of network structures can be connected to private IP network 12 in order to access other networks connected to private IP network 12 or to access public IP network 10.

One example of a network structure connecting to private IP network 12 is hosting network 14. Hosting network 14 is an example of a network structure that provides hosting services for internet websites. These hosting services can be in the form of webfarm 16. Webfarm 16 begins with webservers 30 and database 32 which contain the webpages, programs and databases associated with a particular website such as amazon.com or yahoo.com. Webservers 30 connect to redundant load balancers 28 which receive incoming internet traffic and assign it to a particular webserver to balance the loads across all of webservers 30. Redundant intrusion detection systems 26 and firewalls connect to load balancers 28 and provide security for webfarm 16. Individual webfarms 16 and 17 connect to hosting network 14's switched backbone 18 by means of a network of switches 20 and routers 22. Hosting network 14's switched backbone 18 is itself made up of a network of switches 20 which then connect to one or more routers 22 to connect to private IP network 12. Connections between individual webfarms 16 and 17 and the switched backbone 18 of hosting network 14 are usually made at speeds such as OC-3 or OC-12 (approx. 150 megabits/sec or 625 megabits/sec), while the connection from router 22 of hosting network 14 to private IP network 12 are on the order OC-48 speeds (approx. 2.5 gigabits/sec).

Another example of network structures connecting to private IP network 12 are illustrated with service provider network 34. Service provider network 34 is an example of a network structure for Internet Service Providers (ISPs) or Local Exchange Carriers (LECs) to provide both data and voice access to private IP network 12 and public IP network 10. Service provider network 34 provides services such as internet and intranet access for enterprise networks 36 and 37. Enterprise networks 36 and 37 are, for example, company networks such as the company network for Lucent Technologies or Merrill Lynch. Each enterprise network, such as enterprise network 36, includes a plurality of network servers and individual work stations connected to a switched backbone 18, which can be connected by routers 22 to service provider network 34.

In addition to internet access for enterprise networks, service provider network 34 provides dial-up internet access for individuals or small businesses. Dial-up access is provided in service provider network 34 by remote access server (RAS) 42, which allows personal computers (PCs) to call into service provider network 34 through the public switched telephone network (PSTN), not shown. Once a connection has been made between the PC 50 and RAS 42 through the PSTN, PC 50 can then access the private or public IP networks 12 and 10.

Service provider network 34 also provides the ability to use the internet to provide voice calls over a data network referred to as Voice over IP (VoIP). VoIP networks 46 and 47 allow IP phones 48 and PCs 50 equipped with the proper software to make telephone calls to other phones, or PCs connected to the internet or even to regular phones connected to the PSTN. VoIP networks, such as VoIP network 46, include media gateways 52 and other equipment, not shown, to collect and concentrate the VoIP calls which are sent through service provider network 34 and private and public internet 12 and 10 as required. As mentioned, the advent of VoIP as well as other real time services such as video over the internet make quality of service a priority for service providers in order to match the traditional telephone service provided by traditional telephone companies.

Service provider network 34 includes a switched backbone 18 formed by switches 20 as well as routers 22 between it and its end users and between it and private IP network 12. Domain name servers 44 and other networking equipment, which are not shown, are also included in service provider network 34. Similar to hosting network 34, connection speeds for service provider network 34 can range from speeds such as T1, T3, OC-3 and OC-12 for connecting to enterprise networks 36 and 37 as well as VoIP networks 46 and 47 all the way to OC-48 and conceivably even OC-192 for connections to the private IP network.

It can easily be seen that aggregation points 60 exist at the edges of these various network structures where data is passed from one network structure to another at speeds such as OC-3, OC-12, and OC-48. One major problem in the network structures shown in FIG. 1 is the lack of any type of intelligence at these aggregation points 60 which would allow the network to provide services such as security, metering and quality of service. The intelligence to provide these services would require that the network understand the type of data passing through the aggregation points 60 and not just the destination and/or source information which is currently all that is understood. Understanding the type of data, or its contents, including the contents of the associated payloads as well as header information, and further understanding and maintaining a state awareness across each individual traffic flow would allow the network to configure itself in real time to bandwidth requirements on the network for applications such as VoIP or video where quality of service is a fundamental requirement. An intelligent, or "content aware", network would also be able to identify and filter out security problems such as email worms, viruses, denial of service (DoS) attacks, and illegal hacking in a manner that would be transparent to end users. Further, a content aware network would provide for metering capabilities by hosting companies and service providers, allowing these companies to regulate the amount of bandwidth allotted to individual customers as well as to charge precisely for bandwidth and additional features such as security.

In accordance with the requirements set forth above, the present invention provides for a network device that is able to scan, classify, and modify network traffic including payload information at speeds of OC-3, OC-12, OC-48 and greater thereby providing a "content aware" network.

Figure 2:
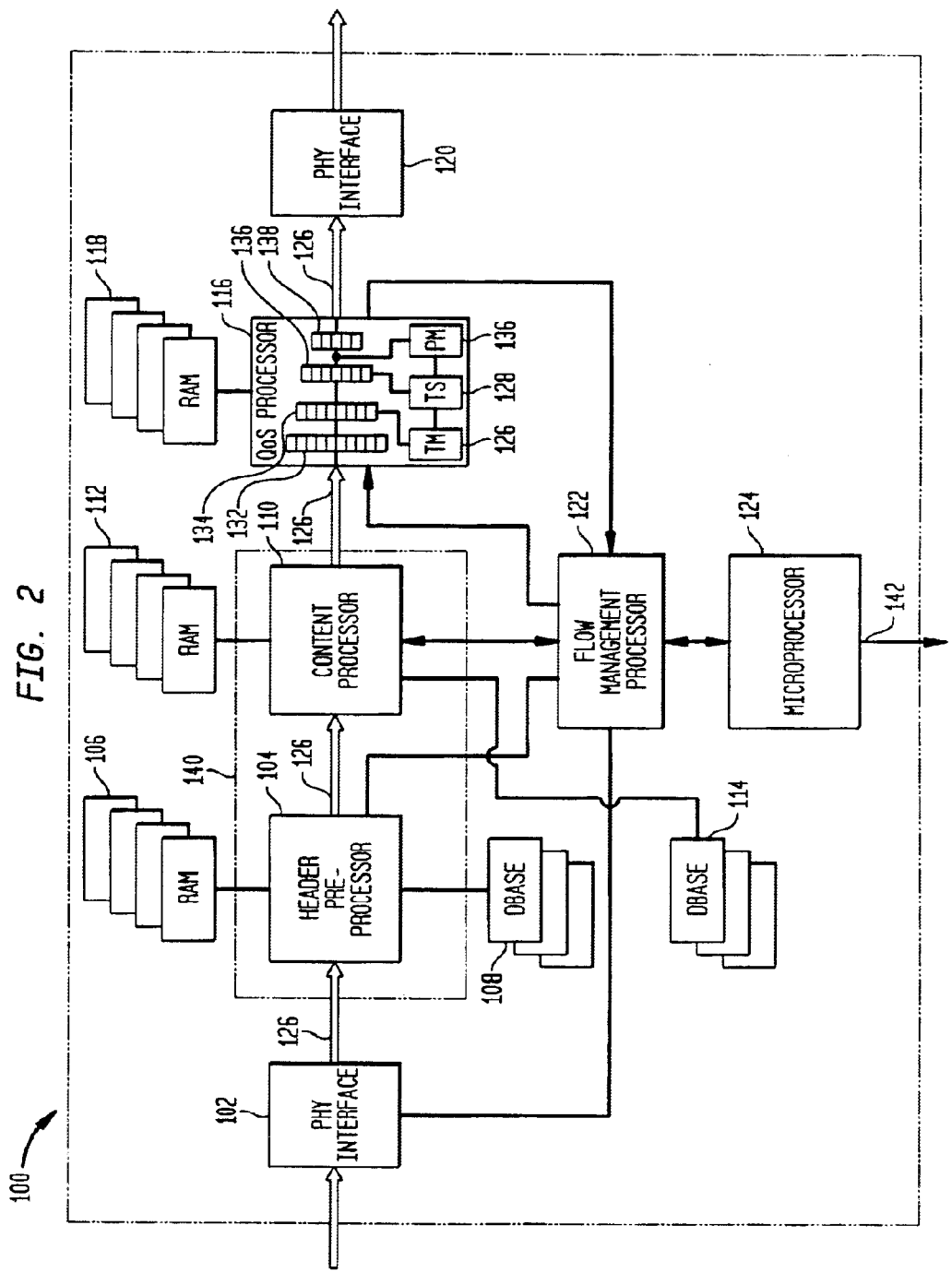
FIG. 2 is a block diagram of a single blade network apparatus according to the present invention.

Referring now to FIG. 2, one embodiment of a network apparatus according to the present invention is shown. Network apparatus 100, as shown, accepts data received from a high-speed network line or lines, processes the data, and then places the data back on a line or lines. Network apparatus 100 accepts data from the line by means of input physical interface 102. Input physical interface 102 can consist of a plurality of ports, and can accept any number of network speeds and protocols, including such high speeds as OC-3, OC-12, OC48, and protocols including 10/100 Ethernet, gigabit Ethernet, and SONET. Input physical interface 102 takes the data from the physical ports, frames the data, and then formats the data for placement on fast-path data bus 126 which is preferably an industry standard data bus such as a POS-PHY Level 3, or an ATM UTOPIA Level 3 type data bus.

Fast-path data bus 126 feeds the data to traffic flow scanning processor 140, which includes header preprocessor 104 and content processor 110. The data is first sent to header preprocessor 104, which is operable to perform several operations using information contained in the data packet headers. Header preprocessor 104 stores the received data packets in packet storage memory 106 and scans the header information. The header information is scanned to identify the type, or protocol, of the data packet, which is used to determine routing information and to decode the IP header starting byte. As will be discussed below, network apparatus 100, in order to function properly, needs to reorder out of order data packets and reassemble data packet fragments. Header preprocessor 104 is operable to perform the assembly of asynchronous transfer mode (ATM) cells into complete data packets (PDUs), which could include the stripping of ATM header information.

After data packets have been processed by header preprocessor 104 the data packets, any conclusion formed by the header preprocessor, such as QoS information, are sent on fast-data path 126 to the other half of traffic flow scanning engine 140, content processor 110. The received packets are stored in packet storage memory 112 while they are processed by content processor 110. Content processor 110 is operable to scan the contents of data packets received from header preprocessor 104, including the entire payload contents of the data packets. The header is scanned as well, one goal of which is to create a session id using predetermined attributes of the data packet.

In the preferred embodiment, a session id is created using session information consisting of the source address, destination address, source port, destination port and protocol, although one skilled in the art would understand that a session id could be created using any subset of fields listed or any additional fields in the data packet without departing from the scope of the present invention. When a data packet is received that has new session information the header preprocessor creates a unique session id to identify that particular traffic flow. Each successive data packet with the same session information is assigned the same session id to identify each packet within that flow. Session ids are retired when the particular traffic flow is ended through an explicit action, or when the traffic flow times out, meaning that a data packet for that traffic flow has not been received within a predetermined amount of time. While the session id is discussed herein as being created by the header preprocessor 104 the session id can be created anywhere in traffic flow scanning engine 140 including in content processor 110.

The scanning of the header by content processor 110 also allows network apparatus 100 to perform routing functions. Routing tables and information can be stored in database memory 112. Routing instructions received by network apparatus 100 are identified, recorded and passed to microprocessor 124 by content processor 110 so that microprocessor 124 is able to update the routing tables in database memory 112 accordingly. While network apparatus 100 is shown as a single blade apparatus, the input and the output could be formed by multiple lines, for example four OC-12 lines could be connected to network apparatus 100 which operates at OC-48 speeds. In such a case, single blade network apparatus 100 will have limited routing or switching capabilities between the multiple lines, although the switching capability will be less than in a conventional router or switch. Additionally, a network apparatus can be constructed according to the principles of the present invention, which is able to operate as a network router or switch. Such an implementation is discussed in greater detail with reference to FIG. 4.

The contents of any or all data packets are compared to a database of known signatures and if the contents of a data packet, or packets, match a known signature, an action associated with that signature and/or session id can be taken by network apparatus 100. Additionally, content processor 110 is operable to maintain state awareness throughout each individual traffic flow. In other words, content processor 110 maintains a database for each session which stores state information related to not only the current data packets from a traffic flow, but state information related to the entirety of the traffic flow. This allows network apparatus 100 to act on not only based on the content of the data packets being scanned but also based on the contents of the entire traffic flow. The specific operation of content processor 110 will be described with reference to FIG. 3.

Once the contents of the packets have been scanned and a conclusion reached by traffic flow scanning engine 140, the packets and the associated conclusions of either or both the header preprocessor and the content processor are sent to quality of service (QoS) processor 116. QoS processor 116 again stores the packets in its own packet storage memory 118 for forwarding. QoS processor 116 is operable to perform the traffic flow management for the stream of data packets processed by network apparatus 100. QoS processor contains engines for traffic management 126, traffic shaping 128 and packet modification 130.

QoS processor 116 takes the conclusion of either or both of header preprocessor 104 and content processor 110 and assigns the data packet to one of its internal quality of service queues 132 based on the conclusion. The quality of service queues 132 can be assigned priority relative to one another or can be assigned a maximum or minimum percentage of the traffic flow through the device. This allows QoS processor to assign the necessary bandwidth to traffic flows such as VoIP, video and other flows with high quality and reliability requirements while assigning remaining bandwidth to traffic flows with low quality requirements such as email and general web surfing to low priority queues. Information in queues that do not have the available bandwidth to transmit all the data currently residing in the queue according to the QoS engine is selectively discarded thereby removing that data from the traffic flow.

The quality of service queues 132 also allow network apparatus 100 to manage network attacks such as denial of service (DoS) attacks. Network apparatus 100 can act to qualify traffic flows by scanning the contents of the packets and verifying that the contents contain valid network traffic between known sources and destinations. Traffic flows that have not been verified because they are from unknown sources or because they are new unclassified flows can be assigned to a low quality of service queue until the sources are verified or the traffic flow classified as valid traffic. Since most DoS attacks send either new session information, data from spoofed sources, or meaningless data, network apparatus 100 would assign those traffic flows to low quality traffic queues. This ensures that the DoS traffic would receive no more than a small percentage (i.e. 5%) of the available bandwidth thereby preventing the attacker from flooding downstream network equipment.

The QoS queues 132 in QoS processor 116 (there are 65 k queues in the present embodiment of the QoS processor although any number of queues could be used) feed into schedulers 134 (1024 in the present embodiment), which feed into logic ports 136 (256 in the present embodiment), which send the data to flow control port managers 138 (32 in the present embodiment) which corresponds to physical egress ports for the network device. The traffic management engine 126 and the traffic shaping engine 128 determine the operation of the schedulers and logic ports in order to maintain traffic flow in accordance with the programmed parameters.

QoS processor 116 also includes packet modification engine 130, which is operable to modify, add or delete bits in any of the fields of a data packet. This allows QoS processor 116 to change addresses for routing or to place the appropriate headers on the data packets for the required protocol. The packet modification engine 130 can also be used to change information within the payload itself if necessary. Data packets are then sent along fast-data path 126 to output PHY interface 120 where it is converted back into an analog signal and placed on the network.

As with all network equipment, a certain amount of network traffic will not be able to be processed along fast-data path 126. This traffic will need to be processed by on board microprocessor 124. The fast-path traffic flow scanning engine 140 and QoS processor 116 send packets requiring additional processing to flow management processor 122, which forwards them to microprocessor 124 for processing. The microprocessor 124 then communicates back to traffic flow scanning engine 140 and QoS processor 116 through flow management processor 122. Flow management processor 122 is also operable to collect data and statistics on the nature of the traffic flow through network apparatus 100. In addition to processing odd, or missing packets, microprocessor 124 also controls the user management interface 142 and recompiles databases 108 and 114 to accommodate new signatures and can be used to learn and unlearn sessions identified by the traffic flow scanning engine 140.

As can be seen from the description of FIG. 2, network apparatus 100 allows the entire contents of any or all data packets received to be scanned against a database of known signatures. The scanned contents can be any variable or arbitrary length and can even cross packet boundaries. The abilities of network apparatus 100 allow the construction of a network device that is content aware which gives the network device the ability to operate on data packets based on the content of that data packet.

Figure 3:
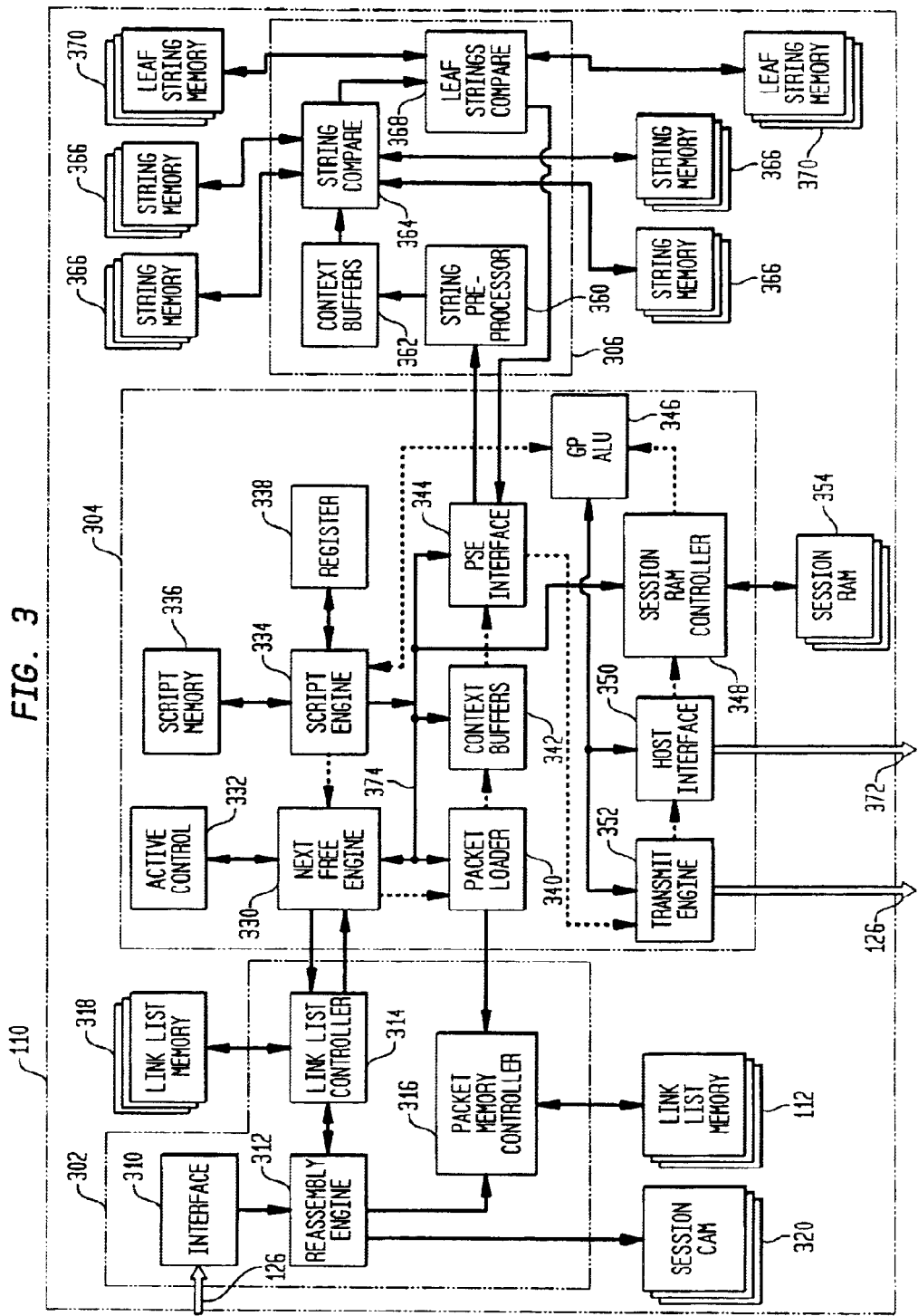
FIG. 3 is a block diagram of the content processor from FIG. 2.

Referring now to FIG. 3, the content processor 110 of FIG. 2 is described in greater detail. As described above, content processor 110 is operable to scan the contents of data packets forwarded from header preprocessor 104 from FIG. 2. Content processor 110 includes three separate engines, queue engine 302, context engine 304, and content scanning engine 306.

Since content processor 110 scans the contents of the payload, and is able to scan across packet boundaries, content processor 110 must be able to reassemble fragmented packets and reorder out of order packets on a per session basis. Reordering and reassembling is the function of queue engine 302. Queue engine 302 receives data off the fast-path data bus 126 using fast-path interface 310. Packets are then sent to packet reorder and reassembly engine 312, which uses packet memory controller 316 to store the packets into packet memory 112. Reordering and reassembly engine 312 also uses link list controller 314 and link list memory 318 to develop detailed link lists that are used to order the data packets for processing. The data packets are broken into 256 byte blocks for storage within the queue engine 302. Session CAM 320 can store the session id generated by queue engine 302 of content processor 110. Reordering and reassembly engine 312 uses the session id to link data packets belonging to the same data flow.

In order to obtain the high throughput speeds required, content processor 110 must be able to process packets from multiple sessions simultaneously. Content processor 110 processes blocks of data from multiple data packets each belonging to a unique traffic flow having an associated session id. In the preferred embodiment of the present invention, context engine 304 of content processor 110 processes 64 byte blocks of 64 different data packets from unique traffic flows simultaneously. Each of the 64 byte blocks of the 64 different data flows represents a single context for the content processor. The scheduling and management of all the simultaneous contexts for content processor 110 is handled by context engine 304.

Context engine 304 works with queue engine 302 to select a new context when a context has finished processing and has been transmitted out of content processor 110. Next free context/next free block engine 330 communicates with link list controller 314 to identify the next block of a data packet to process. Since content processor 110 must scan data packets in order, only one data packet or traffic flow with a particular session id can be active at one time. Active control list 332 keeps a list of session ids with active contexts and checks new contexts against the active list to insure that the new context is from an inactive session id. When a new context has been identified, packet loader 340 uses the link list information retrieved by the next free context/next free block engine to retrieve the required block of data from packet memory 112 using packet memory controller 316. The new data block is then loaded into a free buffer from context buffers 342 where it waits to be retrieved by content scanning engine interface 344.

Content scanning engine interface 344 is the interface between context engine 304 and content scanning engine 306. When content scanning engine 306 has room for a new context to be scanned, content scanning engine interface 344 sends a new context to string preprocessor 360 in content scanning engine 306. String preprocessor 360 is operable to simplify the context by performing operations such as compressing white space (i.e. spaces, tabs, returns) into a single space to simplify scanning. Once string preprocessor 360 has finished, the context is loaded into one of the buffers in context buffers 362 until it is retrieved by scheduler 364. Scheduler 364 controls the input and output to signature memory 366. While four signature memories 366, each of which is potentially capable of handling multiple contexts, are shown any number could be used to increase or decrease the throughput through content scanning engine 110. In the present embodiment, each of the signature memories 366 is capable of processing four contexts at one time.

One of the signature memories 366 is assigned the context by scheduler 364 and then compares the significant bits of the context to the database of known strings that reside in signature memory 366. The signature memory 366 determines whether there is a potential match between the context and one of the known signatures using significant bits, which are those bits that are unique to a particular signature. If there is a potential match, the context and the potentially matched string are sent to leaf string compare 368 which uses leaf string memories 370 to perform a bit to bit comparison of the context and the potentially matched string. Although four string memories 366 and two leaf string memories 370 are shown, any number of string memories 366 and leaf string memories 370 can be used in order to optimize the throughput of content processor 110.

The conclusion of the content scanning is then sent back to the payload scanning interface 344 along with possibly a request for new data to be scanned. The conclusion of the content scanning can be any of a number of possible conclusions. The scanning may not have reached a conclusion yet and may need additional data from a new data packet to continue scanning in which case the state of the traffic flow, which can be referred to as an intermediate state, and any incomplete scans are stored in session memory 354 along with other appropriate information such as sequence numbers, counters, etc. The conclusion reached by signature memory 366 may also be that scanning is complete and there is or isn't a match, in which case the data packet and the conclusion are sent to transmit engine 352 for passing to QoS processor 116 from FIG. 2. The scanning could also determine that the data packet needs to be forwarded to microprocessor 124 from FIG. 2 for further processing, so that the data packet is sent to host interface 350 and placed on host interface bus 372. In addition to handling odd packets, host interface bus 350 allows microprocessor 124 to control any aspect of the operation of content processor 110 by letting microprocessor 124 write to any buffer or register in context engine 304.

State information is stored in session memory 354 and is updated as necessary after the data associated with the particular traffic flow is scanned. The state could be an intermediate state, representing that the matching is incomplete and additional data is needed to continue the scanning. Also, the state could be a partial state indicating that one or more events have occurred from a plurality of events required to generate a particular conclusion. The state may be a final state indicating that a final conclusion has been reached for the associated traffic flow and no further scanning is necessary. Or, the state may represent any other condition required or programmed into the content processor. The state information for each traffic flow, in whatever form, represents the content awareness of network apparatus 100 from FIG. 2, and allows the network apparatus to act not only on the information scanned, but also on all the information that has been previously scanned from each traffic flow.

The operation of transmit engine 352, host interface 350, session memory controller 348, which controls the use of session memory 354, and of general-purpose arithmetic logic unit (GP ALU) 346, which is used to increment or decrement counter, move pointers, etc., is controlled by script engine 334. Script engine 334 operates to execute programmable scripts stored in script memory 336 using registers 338 as necessary. Script engine 334 uses control bus 374 to send instruction to any of elements in context engine 304. Script engine 334 or other engines within content processor 100 have the ability to modify the contents of the data packets scanned. For example, viruses can be detected in emails scanned by content processor 100, in which case the content processor can act to alter the bits of infected attachment essentially rendering the email harmless.

The abilities of content processor 100 are unique in a number of respects. Content processor 100 has the ability to scan the contents of any data packet or packets for any information that can be represented as a signature or series of signatures. The signatures can be of any arbitrary length, can begin and end anywhere within the packets and can cross packet boundaries. Further, content processor 110 is able to maintain state awareness throughout all of the individual traffic flow by storing state information for each traffic flow representing any or all signatures matched during the course of that traffic flow. Existing network processors operate by looking for fixed length information at a precise point within each data packet and cannot look across packet boundaries. By only being able to look at fixed length information at precise points in a packet, existing network processors are limited to acting on information contained at an identifiable location within some level of the packet headers and cannot look into the payload of a data packet much less make decisions on state information for the entire traffic flow or even on the contents of the data packet including the payload.

Figure 4:
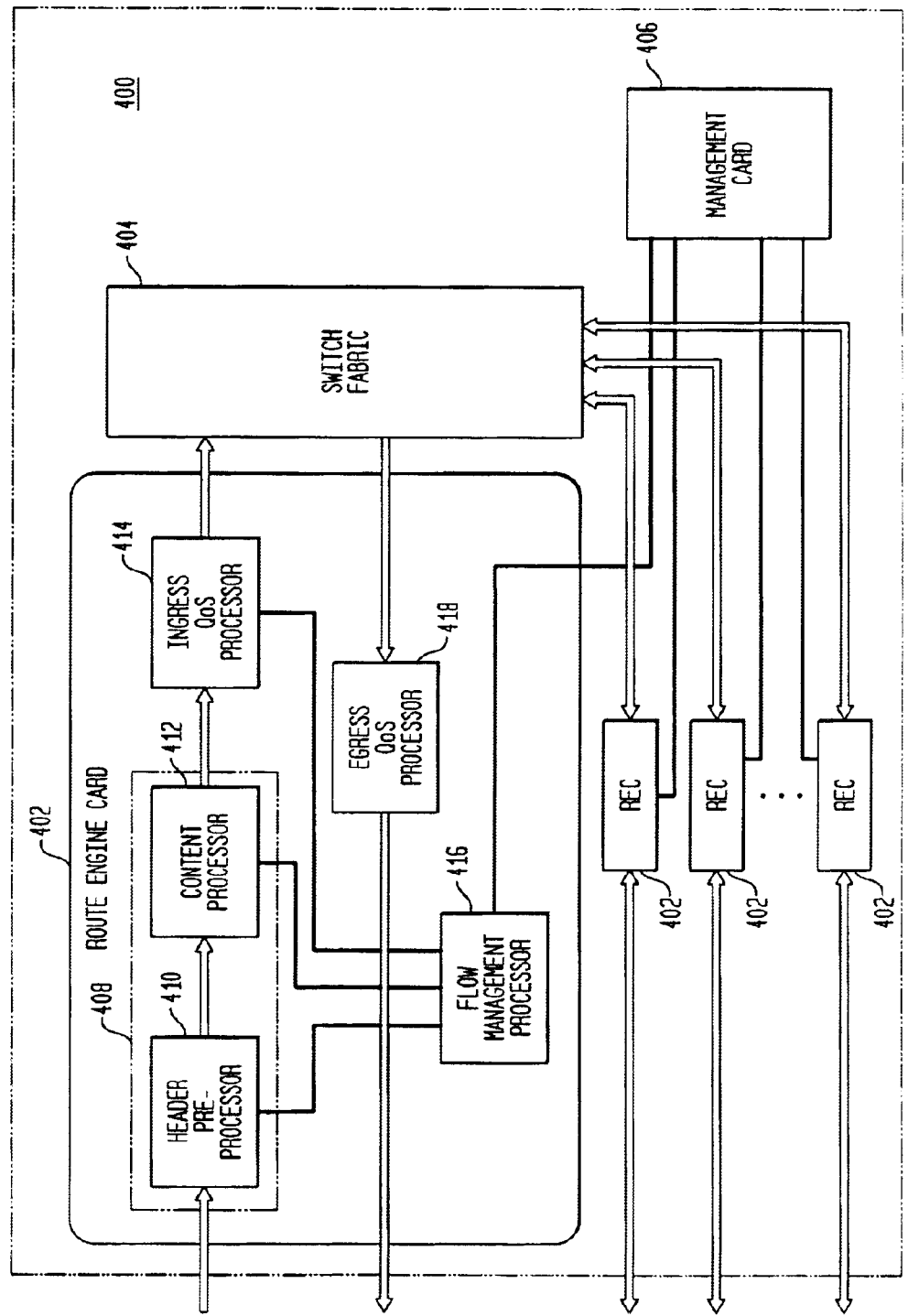
FIG. 4 is a block diagram of a multiple blade routing network apparatus according to the present invention.

Referring now to FIG. 4 an embodiment of the network apparatus of the present invention with routing capabilities is described. Routing network apparatus 400 is formed by two or more route engine cards, or blades, 402 connected to switch fabric 404. One or more management cards 406 are also included to provide a user interface and to manage route engine cards 402. Each of route engine cards 402 operate fundamentally as described with respect to network apparatus 100 of FIG. 2. Traffic flow scanning engine 408, formed by header preprocessor 410 and content processor 412, scans the contents of the data packets and generates a conclusion based on the contents. The packets and associated conclusions are forwarded to ingress QoS processor 414, which assigns the packets to a QoS queue. The data packets are then sent to the switch fabric, which forwards the data packets to the proper route engine card 402 for its assigned output port. The data packet then flows through the egress QoS processor 418, which schedules the traffic received from all the route engine cards 402 for transmission onto the network. The microprocessor 124 shown in FIG. 2 could be present on the route engine card 402 or could potentially be moved to the management card 406 to allow one microprocessor to support multiple route engine cards 402. Each of the route engine cards 402 could even have its own microprocessor with an additional microprocessor on management card 406.

Having multiple route engine cards with multiple ingress and egress paths allows routing network apparatus to function as a routing network device, as opposed to the single ingress and egress path of the "bump-in-the-line" device described with respect to FIG. 2. This allows the routing functions of traffic flow scanning engine 408 to be utilized in routing network apparatus 400.

Figure 5:
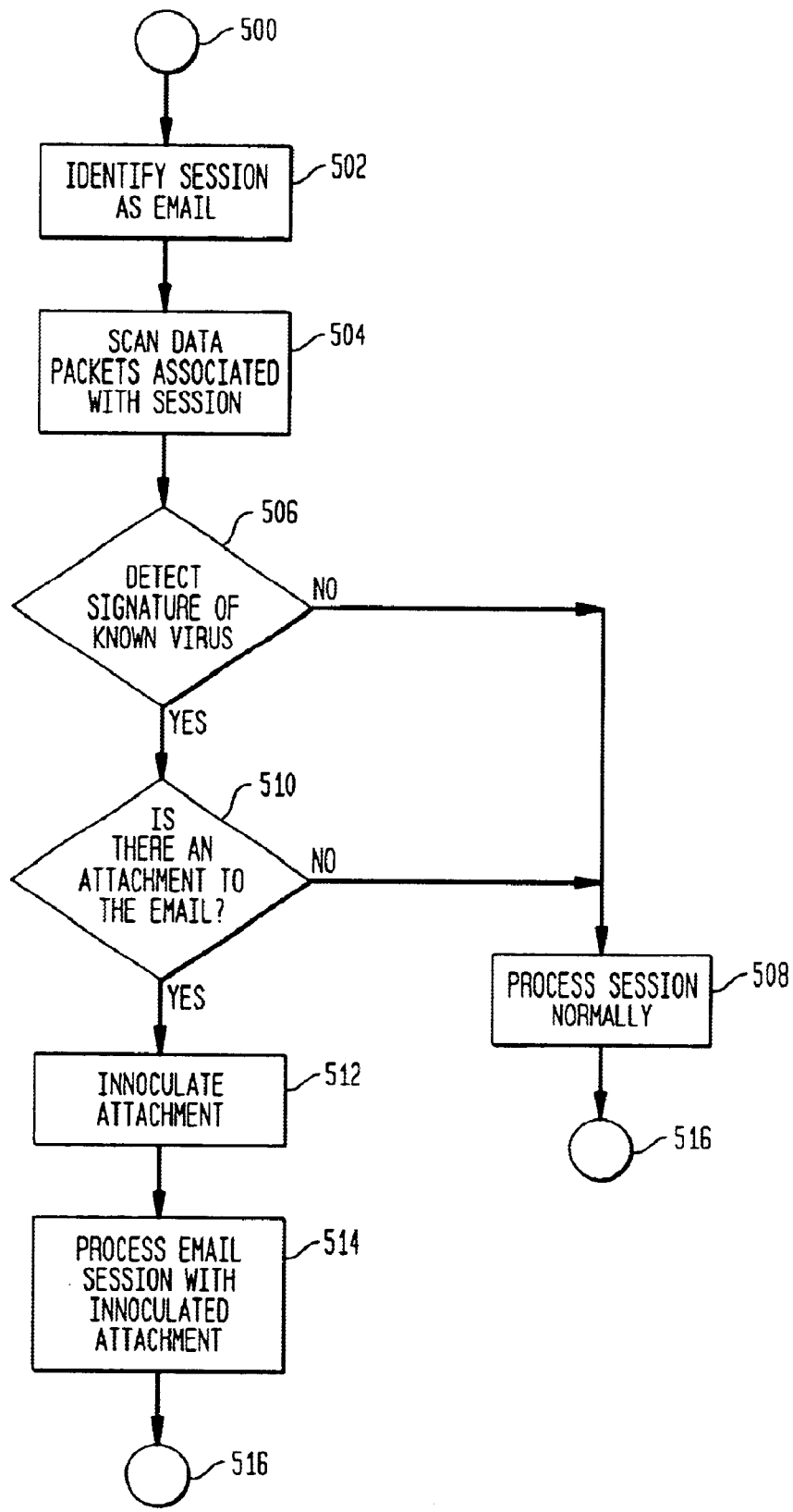
FIG. 5 is a flow chart showing a method for inoculating email with an attachment infected with viruses.

Referring now to FIG. 5, a method of inoculating an email with an attachment infected with a virus is shown. The process begins with start block 500 and proceeds to block 502 where the data packets associated with a particular traffic flow are scanned and determined to be email. The data packets associated with the session, or traffic flow, continue to be scanned as shown by block 504. The method then moves to block 506 where the determination is made if the contents of the traffic flow contain the signature of a known virus. The scanning of the contents of the traffic flow could look for many different types of signatures to detect suspect email. A simple signature would be to detect a characteristic phrase in the subject line or the body of the email. An example of such a signature would be the "Love You" virus, which contained the phrase "I Love You" in the subject line of the email. Other signatures could also easily be detected such as the file name or extension of the attachment or a binary signature within the attachment itself. Any signature that uniquely identifies email infected with a virus could be used and is within the scope of the present invention. If the signature of a virus is not detected then the process passes to block 508, which processes the data packets associated with the session normally, as described with reference to FIGS. 2 through 4.

If a signature of a known virus is detected, the process passes to block 510, which determines if there is an attachment to the email. If there is not an attachment, the process again passes to block 508, which processes the session normally. If there is an attachment, the process passes to block 512, which inoculates the email. The email inoculation can be accomplished in several ways. Data cannot be dropped otherwise sequence number information will be corrupted and the session will not be able to complete itself. Instead, the preferred method of inoculating the email is to alter some or all of the bits of the data packets. For example, one easy way would be to set all the bits of the attachment to either one or zero. This will require the checksum in the head of each packet containing the attachment to be recalculated. As can easily be seen, the bits of the attachment could be altered in many other ways and still render the attachment harmless, all of which are within the scope of the present invention. Once the email has been inoculated, the process passes to block 514 where the email session is processed with the inoculated attachment. The process then ends with end block 516.

As a result of the method described in FIG. 5 the inoculated email will be received by the intended recipient, however, the attachment will be unreadable, thereby preventing the virus from doing any damage or spreading. As described with reference to FIGS. 2 and 3, traffic flows are scanned by content processor 110, which is able to scan entire data packets. When a virus is detected the content processor is further able to modify the data forming the attachment in order to render it harmless.

Additionally, new signatures of viruses are easily and quickly added, thereby minimizing any delay involved in reacting to a newly discovered virus. The new virus signature is added to the database of known signatures stored in string memory 366 from FIG. 3 in one of two ways. First, the new string may be added by inserting the signature into a new database, recompiling the new database using host processor 124 and loading the new database into string memory 366. Or, alternatively, new strings may be added incrementally simply by adding the new string into string memory While the header preprocessor, the QoS processors, and the flow management processor described with reference to FIGS. 2 and 4 can be any suitable processor capable of executing the described functions, in the preferred embodiment the header preprocessor is the Fast Pattern Processor (FPP), the QoS processor is the Routing Switch Processor (RSP), and the flow management processor is the ASI processor, all manufactured by the Agere Division of Lucent Technologies, Austin Tex. Similarly the switch fabric may be any suitable switch fabric as is well known in the industry, including those manufactured by Power X Networks, Inc., 2833 Junction Ave., Suite 110, San Jose, Calif. The microprocessor described with reference to FIGS. 2 and 4 could be any suitable microprocessor including the PowerPC line of microprocessors from Motorola, Inc., or the X86 or Pentium line of microprocessors available from Intel Corporation. Although particular references have been made to specific protocols, implementations and materials, those skilled in the art should understand that the network apparatus, both the "bump-in-the-line" and the routing apparatus can function independent of protocol, and in a variety of different implementations without departing from the scope of the invention.

Although the present invention has been described in detail, those skilled in the art should understand that they can make various changes, substitutions and alterations herein without departing from the spirit and scope of the invention in its broadest form.

We claim:

1. A method for inoculating email infected with a virus, the email being composed of data packets sent over a network and associated with a traffic flow in the network, the method comprising:

scanning the data packets forming the traffic flow associated with the email;

detecting the signature of a known virus in the data packets;

determining whether there is an attachment associated with the email; and altering bits of the data packet associated with the attachment to inoculate the email.

2. The method of claim 1 wherein altering the bits entails setting all the bits associated with the data packet to a predetermined value.

3. The method of claim 1 where in the method is performed by a content processor in a network device operating at wire speed.

4. The method of claim 1 wherein the signature is detected in the text of the email.

5. The method of claim 4 wherein the signature is ASCII text.

6. The method of claim 1 wherein the signature is a binary signature located in the attachment.

7. The method of claim 1 wherein the signature is stored in a memory, the memory holding a database of known signatures.

8. The method of claim 7 wherein a new virus signature is added by loading the new virus signature into the database of new signatures.

9. The method of claim 1 further comprising before scanning the data packets, identifying the data packets as containing email.

10. A network device for scanning and inoculating email infected with a virus, the email being composed of data packets sent over a network and associated with a traffic flow in the network, the network device comprising:

memory storing a database of known signatures, the known signatures including signatures of viruses;

a content processor connected to the memory, the content processor operable to scan the data packets and determine whether the contents of the data packets match one of the signatures of viruses in the database of known signatures, and to determine whether the email associated with the data packets includes an attachment, the content processor further operable to alter bits of the data packets forming the attachment, thereby inoculating the attachment and the email.

11. The network device of claim 10 wherein the content scanning engine is able to scan across multiple data packets by storing intermediate conclusions in a session memory.

12. The network device of claim 10 wherein the content processor is formed by a queue engine operable to reorder out of order data packets, a content scanning engine operable to scan the data packets, and a context engine operable to schedule data packets for scanning by the content scanning engine.

13. The network device of claim 10 wherein the traffic flow is identified by a unique session id.

14. The network device of claim 10 further comprising a quality of service processor connected to the content processor and operable to schedule the transmission of the data packets onto the network.

15. The network device of claim 10 wherein the content scanning engine is able to match signatures of arbitrary length, scan across boundaries of the data packets, and begin and end scanning anywhere within the data packet.

16. The network device of claim 10 further comprising a host processor in communication with the content processor, the host processor operable to compile the database of known signatures and cause it to be loaded into the memory.

17. The network device of claim 16 wherein a new virus signature is added by creating a database of known signatures, recompiling the new database in the host processor, and loading the new database of known signatures into the memory.

18. The network device of claim 16 wherein a new virus signature is added by loading the new virus signature directly into the database of known signatures.

* * * * *